US008323814B2

(12) United States Patent  
Milton et al.

(10) Patent No.: US 8,323,814 B2
(45) Date of Patent: Dec. 4, 2012

(54) BATTERY SAFETY INTERLOCK FOR INTRINSICALLY SAFE ELECTRONIC DEVICES

(75) Inventors: Bruce Forrest Milton, Vancouver (CA); George Yee-ho Chao, Burnaby (CA); Todd David Mawhinney, Surrey (CA)

(73) Assignee: Cooper Technologies Company, Houston, TX (US)

( * ) Notice: Subject to any disclaimer, the term of this patent is extended or adjusted under 35 U.S.C. 154(b) by 322 days.

(21) Appl. No.: 12/751,112

(22) Filed: Mar. 31, 2010

(65) Prior Publication Data

US 2011/0244301 A1   Oct. 6, 2011

(51) Int. Cl.
*H01M 2/10* (2006.01)

(52) U.S. Cl. .............. 429/97; 429/96; 429/98; 439/138; 439/142

(58) Field of Classification Search ............ 429/96, 429/97, 98; 439/138, 142
See application file for complete search history.

(56) References Cited

U.S. PATENT DOCUMENTS

| 5,824,431 A * | 10/1998 | Tsurumaru et al. ............. 429/97 |
| 2009/0289063 A1* | 11/2009 | Fullerton et al. ............... 220/230 |
| 2010/0055549 A1* | 3/2010 | Corder ........................... 429/97 |

* cited by examiner

*Primary Examiner* — Zachary Best
(74) *Attorney, Agent, or Firm* — Armstrong Teasdale LLP

(57) ABSTRACT

A printed circuit board assembly for a battery powered electronic device provides intrinsic safety features with a battery safety interlock element serving as both a physical and electrical barrier to prevent potential sparking at the battery and connecting terminal interfaces.

17 Claims, 3 Drawing Sheets

BATTERY SAFETY INTERLOCK FOR INTRINSICALLY SAFE ELECTRONIC DEVICES

BACKGROUND OF THE INVENTION

The field of the invention relates generally to battery powered electronic devices, and more specifically to intrinsically safe electronic devices such as industrial radio devices.

When electronic devices are operated in hazardous environments, such as those having explosive gas atmospheres, intrinsic safety of the devices is of concern. Intrinsic safety standards are codifed, for example, in IEC 60079-0. When such instrinsic safety standards are successfully implemented, it can be ensured that the available electrical and thermal energy associated with an electronic device remains sufficiently low to prevent ignition in a hazardous atmosphere that is otherwise susceptible to it. This is typically accomplished by ensuring that electronic devices used in hazardous areas operate only with low voltages and currents, with appropriate safety and isolation barriers to ensure safe operation of the device in hazardous environments.

Self contained, battery powered devices have been developed with instrinsic safety features in normal use. Routine maintenance procedures for such devices, however, can compromise well designed intrinsic safety features of the device if the maintenance procedures are performed in the hazardous environment. For example, if one attempts to access the batteries of the device after removing a protective cover, and then disconnect or connect the batteries of the device while remaining in a hazardous environment, small sparking may result between a battery and the battery retaining clip as the circuit is effectively made or broken by inserting or removing the batteries. In a hazardous environment, any sparking is simply unacceptable.

To address sparking issues associated with batteries of an electronic device, some known electronic devices include a battery harness with a plug type connector engaging a socket type connector of the main circuit board in the device. To replace the batteries in devices of this type, the plug connector must first be removed from the socket connector to de-energize the circuit including the harness. Next, the battery harness must be removed from the device, and the batteries can then be removed from the harness and be replaced. While such features can and do provide an additional degree of safety when properly used, it is possible that they may be mis-used in a manner in which the safety features are defeated. For example, one may remove the harness from the device and attempt to remove the batteries from the harness without first unplugging the harness from the device, and sparking can still result.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
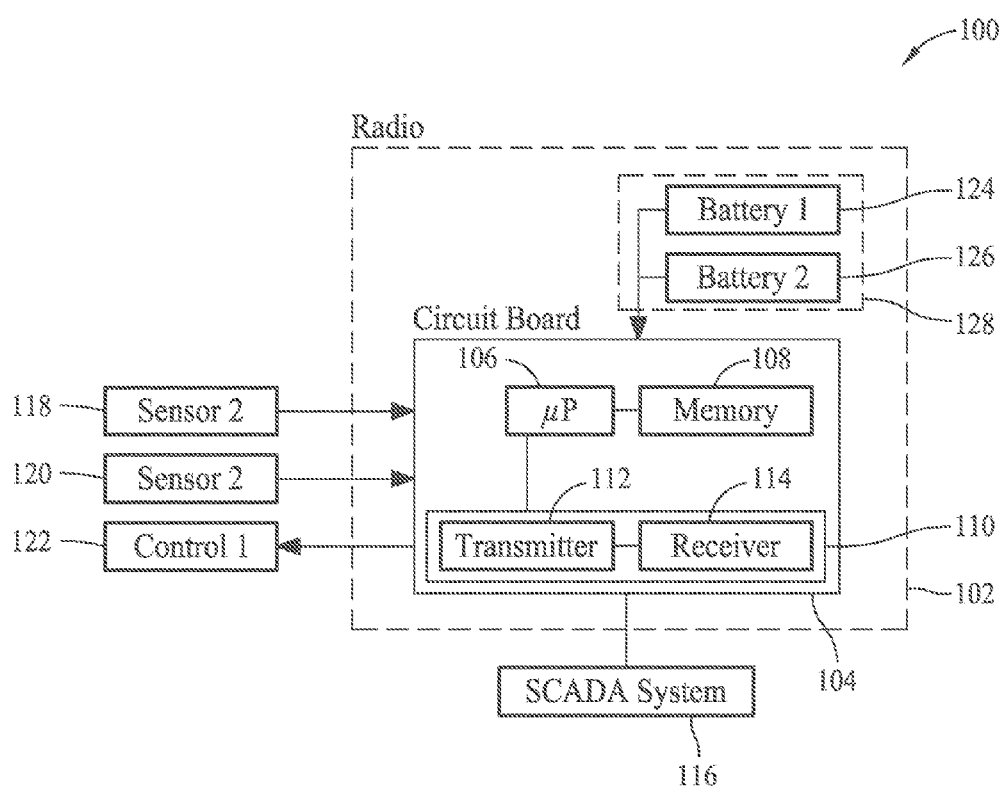
FIG. 1 is a schematic diagram of an exemplary intrinsically safe electronic device in an industrial radio application.

FIG. 1 is a schematic diagram of an exemplary intrinsically safe electronic device 100 in the form of an industrial radio device. It is understood, however, that the benefits of the inventive concepts explained below accrue equally to other types of electronic devices for other purposes that are likewise used in hazardous operating environments. The following discussion is therefore provided solely for purposes of illustration rather than limitation.

In the example shown, the radio device 100 is a programmable processor-based device including a housing 102 enclosing a circuit board 104 configured to implement the functionality of the device 100. The circuit board 104 includes a processor 106 and a memory storage 108 wherein executable instructions, commands, and control algorithms, as well as other data and information such as communication network and protocol parameters required to satisfactorily operate the radio device 100 are stored. The memory 108 of the processor-based device 100 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown, but also other equivalent element such as, microcontrollers, microcomputers, programmable logic controllers, reduced instruction set (RISC) circuits, application specific integrated circuits and other programmable circuits, logic circuits, equivalents thereof, and any other circuit or processor arrangement known in the art for operating such as device 100. The processor-based devices listed above are exemplary only, and are thus not intended to limit in any way the definition and/or meaning of the term "processor-based device."

The circuit board 102 in the exemplary embodiment shown also includes a radio transmission element 110 that may include a transmitter 112 and a receiver 114. Alternatively, the transmitter 112 and receiver 114 may be combined into a single device referred to as a transceiver. In various embodiments the radio transmission element 110 sends and/or receives wireless data signals using known radio frequency transmission techniques. The data and information communicated with the radio transmission element 110 may be processed, formatted or converted into an appropriate communications protocol by the processor 106 utilizing information stored in the memory 108. For example, digital radio frequency signals may be transmitted and received using a specified protocol for the contents of the data messages sent in a particular communications network. Parameters for network communication may include data and information such as the size (i.e., the number of bits) of the data signals transmitted, the order of bits constituting the message, unique radio identifiers, hardware and software version codes, security codes, diagnostic codes and the like as those in the art will appreciate.

Additionally, desirable signal processing such as amplification, filtering, signal conversion (e.g., DC to AC conversion), and diagnostic procedures may be performed. Algorithms and instructions for executing specific communication protocols and procedures are stored in the memory 108, for example, and executed by the processor 106 to communicate information over a communication network, which may be part of a Supervisory Control and Data Acquisition (SCADA) system 116. The radio device 110 may be part of a remote terminal unit (RTU) in the SCADA system 116.

The radio device 100 in the example shown is connected to inputs such as sensors, transducers and like monitoring or condition detecting elements associated with the industrial process being monitored and controlled (collectively referred to herein as "sensors") indicated by the reference numerals 118 and 120 and an output element 122 such as a control device for an industrial process. The sensors 118 and 120 generate and provide control feedback signals indicative of the state of the industrial process, and the control device 122 provides for adjustment of the monitored process at the point of the sensors 118 and 120 to effect changes in the state. A variety of sensors are known to detect various aspects of the monitored state which may correspond to a machine state, a component state, a process step, or other parameter of interest to the SCADA system. As examples only, monitored aspects of an industrial process detected by the sensors 118 and 120 may include electrical states or conditions (e.g., current or voltage conditions), mechanical states or conditions (e.g., position, velocity, acceleration, stress and strain), a physical state or condition (e.g., temperature, phase, or formulation), an environmental state or condition (e.g., noise, vibration, air quality) and other states of conditions of interest.

A variety of control devices 122 are also known and familiar to those in the art, any of which may be utilized to respond to abnormal or unaccepted states or conditions at various points in the industrial process. The control device 122 may include or may coordinate switching elements, machine controls, or component controls to affect a change in state or condition without human intervention. The control device 122 may also interrupt the industrial process to avoid undesirable results stemming from detected states or conditions, or activate alarm elements and features for response and decisions to be made by human persons. It is understood that the control element 122 may be in the same or different physical location as the sensors 118 and 120. That is, the control element 122 may be located upstream or downstream from the sensors 118, 120 in the industrial process such that in practice the sensors 118, 120 and the control element 120 may not be connected to the same radio device 100.

Furthermore, while two sensors 118, 120 and one control device 122 are shown, it is understood that other numbers of sensors and control devices may alternatively be connected to the radio device 100 or to radio devices 100 with like effect. In different embodiments, the sensors 118 and 120 may be hard wired to the radio device 100, may wirelessly communicate with the radio device 120, or be combinations of hardwired and wireless devices. Typically, a number of radios are distributed throughout the industrial process, with each radio connected to different sensors to provide control inputs and feedback throughout the industrial process, and the radios communicating in a network using the specified communication protocol.

In addition, instead of dedicated sensors and control devices as shown, the functions of these devices could be combined in one or more input/output devices that are capable of bi-directional communication with the radio device or devices 100. In any event, data and information collected via the sensors and/or control devices is collected by each radio device 100 in the SCADA system 116, and communicated to a remote location using the specified communications protocol. Additionally, information such as control commands may be received by the radio device 100 from a remote location according to the specified communication protocol, and sent to the control device 120.

The industrial process monitored and controlled with the radio device 100 may involve a hazardous environment presenting risks of ignition and fire, for example. In various exemplary applications, the ambient environment of the radio device 100 may include flammable gases or compositions. It is therefore important that the available electrical and thermal energy associated with the radio device 100 remains sufficiently low to prevent ignition of such gases or compositions. Accordingly, the radio device 100 may be a relatively low power device including batteries 124 and 126, as opposed to relative high power line supplies. Using low voltage batteries 124 and 126 to power the circuit board 104, currents and heat produced by the device 100 in operation will remain below a level that could cause ignition in the hazardous atmosphere. The device housing 102 provides a protective enclosure around the circuit board 104, and the batteries 124 and 126 are protected in a battery compartment enclosed by a removable battery cover 128. In normal use, the device 100 is therefore intrinsically safe per the guidelines of, for example, IEC 60079-0.

As previously mentioned, intrinsic safety of the device 100 can be compromised as the device 100 is serviced and maintained in the field (i.e., in the hazardous environment itself). For example, as the batteries 124 and 126 become depleted, they must be replaced. When performing other maintenance issues for the device 100 or the surrounding components 118, 120, 122 it may be advisable to disconnect the batteries 124 and 126. As the circuit paths between the batteries 124 and 126 are broken or made by disconnecting or connecting the batteries 124, 126 there is some risk of small sparking or other energy emissions that are undesirable in a hazardous environment where the device 100 is used. That is, in many known battery powered devices that are otherwise intrinsically safe, the interfaces of the battery terminals and the batteries are not, and when the batteries are installed or removed while the device is in the hazardous area or location, undesirable sparking can occur at the battery/terminal interfaces.

Figure 2:
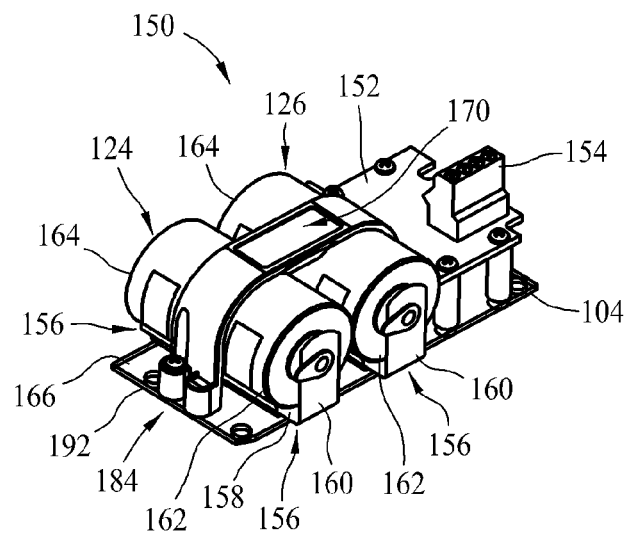
FIG. 2 is a perspective view of an exemplary circuit board assembly for an intrinsically safe device.
Figure 3:
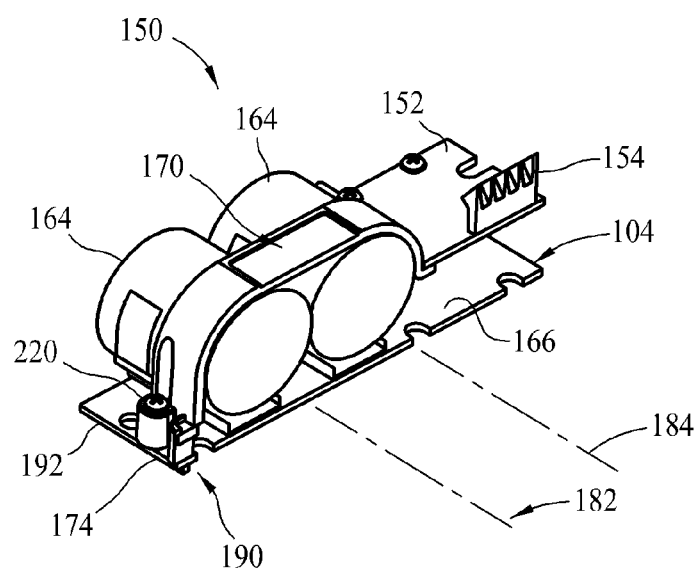
FIG. 3 is a sectional view of the circuit board assembly shown in FIG. 2.

FIGS. 2 and 3 illustrate an intrinsically safe circuit board assembly 150 for the device 100 that avoids problematic sparks associated with connection or disconnection of the batteries 124, 126 from the circuit board 104. As shown in FIGS. 2 and 3, the assembly 150 includes the circuit board 104, sometimes referred to as a main board or mother board, and an auxiliary circuit board 152, sometimes referred to as a daughter board. The auxiliary board 152 may include, as shown, an input/output connect 154. The circuit boards 104 and 152 may communicate in a known manner and collectively are configured to send, receive, and process signals and information according to known radio device techniques and communication protocols. Alternatively, when the device 100 is a non-radio device, the circuit boards 104 and 152 can be configured to provide other types of electronic functionality in accordance with a large variety of known electronic devices. While two circuit boards 104 and 152 are shown, greater or fewer circuit boards may alternatively be used in other embodiments depending on the desired level of sophistication of the device 100.

Battery terminals 156 are coupled to the main circuit board 104 in the exemplary embodiment shown and receive the batteries 124 and 126 to power the circuit boards 104 and 152. In the exemplary embodiment shown, each battery terminal 156 includes a base section 158 mounted to the circuit board 104, and a battery terminal clip 160. The terminal clips 160 are arranged in spaced apart pairs and accommodate the respective batteries 124, 126 therebetween. Each clip 160 in the spaced apart pairs of terminals 156 is configured to respectively engage a polarized end 162 or 164 of each battery 124, 126, and the batteries 124 and 126 are generally adjacent one another in a compact configuration. The base section 158 of each battery terminal 156 extends generally coplanar with a first major surface or side 166 of the circuit board 104 and the terminal clips 160 extend substantially perpendicular to the plane of the base section 156 and the circuit board 104.

In one embodiment, the batteries 124 and 126 are each a D-cell battery providing a voltage of about 1.5 V to power the circuit board 104. Other types of batteries are known, however, and are authorized for use in intrinsically safe devices in applicable standards such as EN 60079-0. As one example, batteries with different cell sizes and configuration, other than D-cells may alternatively be used with similar effect in other embodiments. While two batteries 124 and 126 are illustrated in the assembly 150, greater or fewer numbers of batteries may likewise be employed in other embodiments.

A battery interlock element 170 is removably coupled to the circuit board 104 and extends over the batteries 124 and 126 and the terminals 156. Also shown in FIGS. 3 and 4, the battery interlock element 170 may include a nonconductive barrier arm 172 and a switch actuator 174 (FIG. 3) coupled thereto. The barrier arm 172 may be fabricated from a plastic material, for example, using known techniques and is configured to extend over both batteries 124 and 126 when mounted to the circuit board 104. As such, neither battery 124 or 126 can be removed or installed without first removing the interlock element 170. The interlock element 170 therefore provides a physical barrier to connecting or disconnecting the batteries 124 and 126 from the circuit board 104. Because the interlock element 170 extends over both batteries 124, 126, and their connecting terminals 156, neither of the batteries 124 or 126 can be removed or installed without first removing the interlock element 170.

In the exemplary embodiment illustrated, the barrier arm 172 is substantially U-shaped and includes an elongated barrier section 176 that is extended over the batteries 124, 126 when installed. Upright sections 178, 180 are provided on either end of the barrier section 176 and are shaped to respectively wrap around the sides of the batteries 124 and 126 and extend toward the circuit board 104 in a substantially perpendicular relation to the first major surface or side 166 of the circuit board 104.

The battery terminals 156 are configured to engage each battery 124, 126 when the batteries are aligned with respective axes 182 and 184 each extending generally parallel to the first surface or side 166 of the board 104. The battery axes 124, 126 extend roughly perpendicular to the terminal clips 156 and so the polarized battery ends 162, 164 can engage the clips 158. The barrier section 176 of the barrier arm 172 extends transversely to battery axes 182 and 184, but still generally parallel to the circuit board first planar surface or side 166. While one exemplary configuration is shown, other geometries of the barrier arm 172 relative to the batteries and/or terminals 156 are possible and may be utilized.

Figure 4:
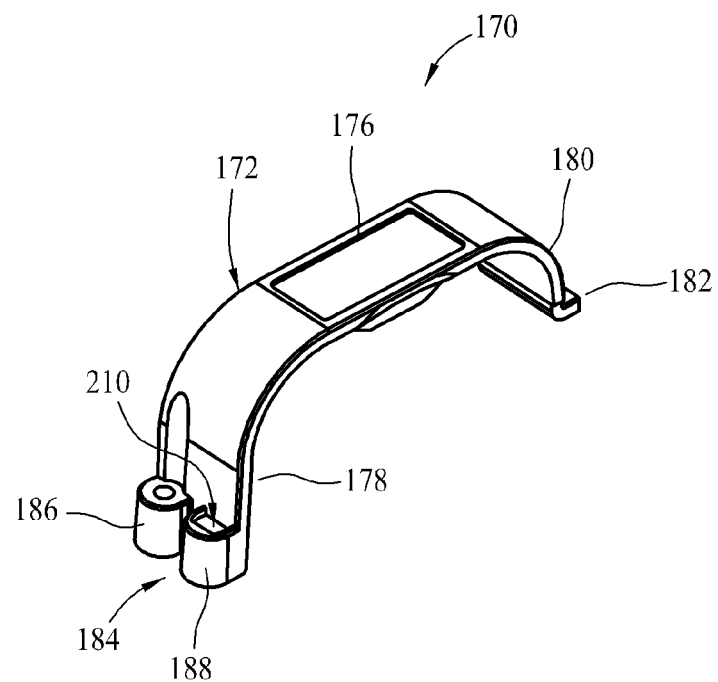
FIG. 4 is a first perspective view of the exemplary battery interlock element for the circuit board assembly shown in FIGS. 2 and 3.
Figure 5:
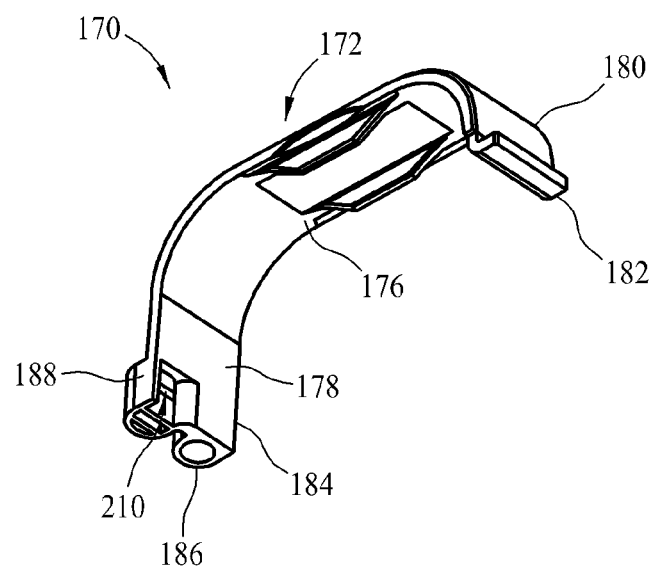
FIG. 5 is a second perspective view of the battery interlock element shown in FIG. 4.

Further, and as best shown in FIGS. 4 and 5, the upright section 178 of the barrier arm 172 is longer than the upright section 180. The upright section 180 includes a hook shaped distal end 182 that may be received under and engaged to an end of the auxiliary circuit board 152 (FIGS. 2 and 3) when installed. As the auxiliary board 152 is spaced from the main board 104 the shorter length of the upright section 178 is appropriate. The opposite upright section 178, however, extends to the first side 166 of the main board 104 and therefore is longer than the upright section 180. As shown in FIGS. 4 and 5, a distal end 184 of the upright section 178 is further formed with a fastener portion 186 and a switch actuator portion 188 positioned generally side-by-side or adjacent one another.

Figure 6:
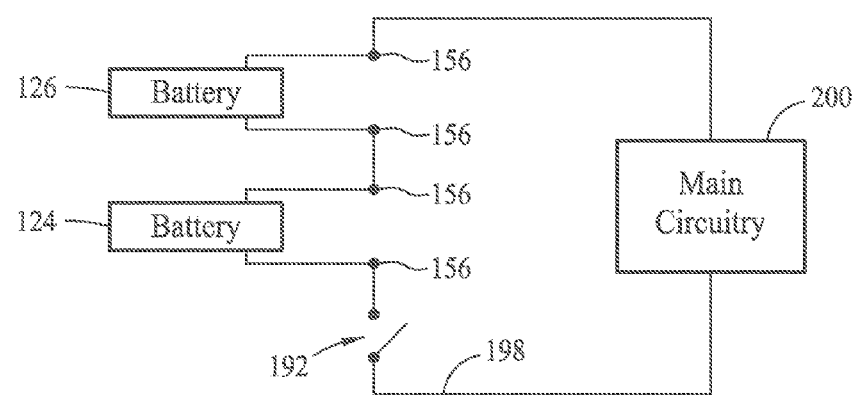
FIG. 6 schematically illustrates exemplary circuitry for the circuit board assembly shown in FIGS. 2 and 3.

The switch actuator portion 188 includes the switch actuator 174 (FIG. 3). The switch actuator 174 interacts with a switch 190 mounted to a second major surface or side 192 of the circuit board 104 opposing the first major surface or side 166. The switch 190 is responsive to a presence or absence of the interlock element 170 to open or close a circuit path 198 on the circuit board 104 connecting the main circuitry 200 (FIG. 6) of the board 104 to the battery terminals 156. The switch 192 closes the circuit path 198 between the main circuitry 200 and the battery terminals 156 when the interlock element 170 is installed, and opens the circuit path 198 when the interlock element 170 is removed. As such, when the interlock element 170 is removed, as it must be to connect or disconnect one of the batteries 124 or 126, the switch 192 opens and de-energizes the battery terminals, thereby avoids any possibility of sparking conditions when connecting or disconnecting the batteries 124, 126. In other words, because the connecting terminals 156 are part of an open circuit when the interlock element 170 is removed, no circuit connections are broken or established when disconnecting and connecting the batteries 124, 126 from the battery terminals 156 and sparking associated therewith cannot occur.

Once closed, via the removal of the interlock element 170, the switch 192 remains closed until the interlock element 170 is again installed, and then the switch 192 again closes the circuit path 198 and completes the circuit through the batteries, restoring power to the circuit board 104.

In an exemplary embodiment, the switch actuator 174 carried on the end 184 of the barrier arm upright section 184 is a magnet, and the switch 192 is a reed switch that operates in response to the presence of absence of the magnetic field of the magnet. The magnet switch actuator 184 may be a rare earth magnet, and when the magnet is placed near the reed switch 190 the switch may be closed to complete the circuit between the main circuitry 200 on the board 104 and the battery terminals 156. When the magnet is removed, the reed switch 190 may be opened to isolate the battery terminals 156 from the main circuitry 200 of the board 104. Because the magnet is mounted stationary to the barrier arm 170, such as in a pocket 210 formed in the switch actuator section 188 of the barrier arm end 184, when the barrier arm 170 is removed from the circuit board 104 the magnet is also removed from the circuit board 104, causing the switch 190 to open. Likewise, when the barrier arm 170 is installed to the board 104 the magnet is placed near the switch 190 again and the circuit is closed through the switch 190 so that battery power is again supplied to the main circuitry 200 on the board 104.

Because the reed switch 190 is responsive to a position of the magnet switch actuator 174, the switching occurs automatically as the interlock element 170 is removed and installed, without the user having to take any action other than removing or installing the interlock element 170. Since the interlock element 170 must be removed to replace or install the batteries 124, 126 the battery terminals 156 are inherently electrically isolated before either of the batteries 124 or 126 can be engaged or disengaged from the battery terminals 156. Any chance of sparking at the battery/terminal clip interfaces is therefore eliminated. The circuit is complete only when the barrier 170 arm is installed, and when so installed the barrier arm 170 frustrates any attempt to install, remove or replace a battery 124, 126. Thus, the interlock element 170 provides both a physical barrier and an electrical barrier to the creating of sparks as the batteries 124, 126 are installed and removed.

Furthermore, the placement of the reed switch 190 on the second major surface or side 192 of the board 104, as opposed to the first surface or side 166 where the switch actuator magnet 174 of the interlock element 170 is located, has further benefits. The switch 190 is generally protected when the battery cover 128 (FIG. 1) is opened, as only a portion of the first surface 166 proximate the battery terminals 156 will be exposed. Inadvertent contact with and damage to the switch 190 is not possible because the second surface 192 of the circuit board 104 including the switch 190 faces the interior of the device 100, and not the exposed side 166 of the board 104 where the battery terminals 156 are located.

While the magnet switch actuator 174 and the reed switch 190 are believed to be beneficial for the reasons stated, other types of switches and actuators are known and may likewise be used in alternative embodiments to provide similar functionality to selectively energize or de-energize the battery terminals 156 as the interlock element 170 is installed and removed from the board 104.

A single fastener 220 (FIG. 3) is also provided for securely coupling the interlock element 170 to the circuit board 104. By positively securing the interlock element 170 to the circuit board 104 in such a manner, the switch actuator magnet 174 carried by the barrier section end 184 can be ensured to operate the switch 190 to supply power to the circuit board 104 from the batteries 124, 126. That is, the fastener 220 ensures that once the switch 190 is closed, it remains closed so that power can be reliably supplied from the batteries 124 and 126 to the main circuitry 200 on the board 104. In the illustrated embodiment, the fastener 220 is a screw that engages the fastener portion 186 (FIGS. 4 and 5) of the barrier section end 184 with threaded engagement, and also a threaded connector portion on the circuit board 104. Other types of fasteners are known, however, and likewise may be utilized for similar purposes. The fastener 186 may, as shown in the illustrated embodiments, engage the same end 184 of the battery interlock element 170 that carries the switch actuator magnet 174. The switch 190 is positioned on the circuit board 104 proximate the fastener 220, but on the opposite side of the board 104, so that the switch actuator magnet 174 is reliably positioned proximate the switch 190. It is understood, however, that the location of the fastener 220 need not necessarily be positioned proximate the fastener in another embodiment, but rather could be positioned elsewhere if desired.

One can easily attach or remove the interlock element 170 using the single fastener 220. To attach the interlock element 170, the distal end 182 of the barrier arm 170 may be positioned under an end of the auxiliary board 152 and pivoted around the battery 126 to extend the arm section 176 across the batteries 122 and 124 and to bring the barrier arm end 184 into engagement with the surface 166 of the board 104 where the fastener 220 can be engaged. To remove the interlock element 170, the fastener 220 is removed and the end 184 of the barrier arm can be lifted to release the opposite end 182 from the auxiliary board 152. While a single fastener 220 minimizes the time required to remove or install the interlock element 170, more than one fastener may be provided in another embodiment.

The benefits and advantages of the invention are now believed to be amply illustrated in the exemplary embodiments disclosed.

An exemplary embodiment of an intrinsically safe electronic device is disclosed including a circuit board assembly comprising: a circuit board; at least one battery terminal coupled to the circuit board; a battery interlock element removably coupled to the circuit board and providing a physical barrier to a battery associated with the at least one battery terminal when the interlock element is installed; and a switch coupled to the circuit board. The switch is responsive to a presence or absence of the interlock element to open or close a circuit path on the circuit board to the at least one battery terminal, wherein the switch closes the circuit path when the interlock element is installed, and wherein the switch opens the circuit path when the interlock element is removed.

Optionally, the battery interlock element may include a barrier arm and a switch actuator. The barrier arm may be nonconductive, and the barrier arm may be substantially U-shaped. The at least one battery terminal may be configured to engage a battery aligned with a first axis, and the barrier arm may extend along a second axis transverse to the first axis. The at least one battery terminal may include opposed, spaced apart battery terminal clips configured to respectively engage a polarized end of a battery. The circuit board may extend in a first plane, and the battery terminal clips may extend substantially perpendicular to the first plane. The battery may be a D-cell battery.

Also optionally, the switch actuator may be located on an end of the barrier arm. The switch actuator may include a magnet, and more specifically may be a rare earth magnet. The magnet may be mounted stationary to the barrier arm, whereby when the barrier arm is removed from the circuit board the magnet is removed from the circuit board. The switch may include a reed switch responsive to a position of the magnet. The circuit board may have opposing first and second major surfaces, with the magnet being positioned on one of the first and second major surfaces when installed, and the reed switch being positioned on the other of the first and second major surfaces.

The at least one battery terminal may further include a first terminal for a first battery and a second terminal for a second battery, with the battery interlock element configured to prevent disconnection of either of the first and second batteries from the respective first and second terminal when the interlock element is installed.

A fastener may be provided for coupling the interlock element to the circuit board. The fastener may be a screw, and the fastener may engage an end of the battery interlock element. The battery interlock element may include a switch actuator, and the switch actuator may be located adjacent the end of the battery interlock element. The switch may be positioned on the circuit board proximate the fastener. The circuit board may include first and second major surfaces, with the switch being located on one of the first and second major surfaces and the end of the battery interlock element being located on the other of the first and second major surfaces. The switch may include a reed switch and the switch actuator may include a magnet.

A housing may be provided that encloses the circuit board assembly. A removable battery cover may be coupled to the housing, with the at least one battery terminal being located proximate the battery cover such that the battery terminal and battery interlock element are accessible when the battery cover is removed. The device may be a radio device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An intrinsically safe electronic device comprising:
   a circuit board assembly comprising:
   a circuit board;
   at least one battery terminal coupled to the circuit board;
   a battery interlock element removably coupled to the circuit board and providing a physical barrier to a battery associated with the at least one battery terminal when the interlock element is installed, wherein the battery interlock element comprises a barrier arm and a switch actuator, wherein the switch actuator is located on an end of the barrier arm, and wherein the switch actuator comprises a magnet; and
   a switch coupled to the circuit board, the switch responsive to a presence or absence of the interlock element to open or close a circuit path on the circuit board to the at least one battery terminal;
   wherein the switch closes the circuit path when the interlock element is installed;
   wherein the switch opens the circuit path when the interlock element is removed;
   wherein the switch comprises a reed switch responsive to a position of the magnet; and
   wherein the circuit board has opposing first and second major surfaces, the magnet being positioned on one of the first and second major surfaces when installed, and the reed switch being positioned on the other of the first and second major surfaces.

2. The device of claim 1, wherein the barrier arm is non-conductive.

3. The device of claim 1, wherein the barrier arm is substantially U-shaped.

4. The device of claim 1, wherein the at least one battery terminal is configured to engage a battery aligned with a first axis, and the barrier arm extends along a second axis transverse to the first axis.

5. The device of claim 1, wherein the at least one battery terminal comprises opposed, spaced apart battery terminal clips configured to respectively engage a polarized end of a battery.

6. The device of claim 5, wherein the circuit board extends in a first plane, and the battery terminal clips extend substantially perpendicular to the first plane.

7. The device of claim 5, wherein the battery is a D-cell battery.

8. The device of claim 1, wherein the magnet is a rare earth magnet.

9. The device of claim 1, wherein the magnet is mounted stationary to the barrier arm, whereby when the barrier arm is removed from the circuit board the magnet is removed from the circuit board.

10. The device of claim 1, wherein the at least one battery terminal comprises a first terminal for a first battery and a second terminal for a second battery, the battery interlock element configured to prevent disconnection of either of the first and second batteries from the respective first and second terminal when the interlock element is installed.

11. The device of claim 1, further comprising a fastener for coupling the interlock element to the circuit board.

12. The device of claim 11, wherein the fastener is a screw.

13. The device of claim 11, wherein the fastener engages an end of the battery interlock element.

14. The device of claim 13, wherein the switch is positioned on the circuit board proximate the fastener.

15. The device of claim 1, further comprising a housing enclosing the circuit board assembly.

16. The device of claim 15, further comprising a removable battery cover coupled to the housing, the at least one battery terminal being located proximate the battery cover such that the battery terminal and battery interlock element are accessible when the battery cover is removed.

17. The device of claim 15, wherein the device is a radio device.

* * * * *